United States Patent [19]

Fox et al.

[11] Patent Number: 5,203,734
[45] Date of Patent: Apr. 20, 1993

[54] FOOD CASINGS WITH IMPROVED TUBULAR TAB ENDS

[75] Inventors: Mark L. Fox, Pleasant Valley, Mo.; Thomas R. Stanley, Georgetown, Ill.

[73] Assignee: Teepak, Inc., Westchester, Ill.

[21] Appl. No.: 908,094

[22] Filed: Jul. 2, 1992

Related U.S. Application Data

[63] Continuation-in-part of Ser. No. 573,953, Aug. 28, 1990, Pat. No. 5,127,873.

[51] Int. Cl.⁵ .............................................. A22C 13/00
[52] U.S. Cl. .......................................... 452/32; 452/21; 452/30; 138/118.1
[58] Field of Search .................. 452/30, 21, 32, 33, 452/35, 198; 138/118.1

[56] References Cited

U.S. PATENT DOCUMENTS

| | | | |
|---|---|---|---|
| 3,148,991 | 9/1964 | Svendsen | 452/21 |
| 3,411,177 | 11/1968 | McMillan | 452/21 |
| 3,826,852 | 7/1974 | Levaco et al. | 452/21 |
| 4,363,819 | 12/1982 | Steffen | 138/118.1 |
| 4,550,042 | 10/1985 | Andrae et al. | 452/26 |
| 5,127,873 | 7/1992 | Stanley et al. | 452/198 |
| 5,156,565 | 10/1992 | Jonnard | 452/21 |

*Primary Examiner*—Willis Little
*Attorney, Agent, or Firm*—Howard M. Ellis; Michael L. Dunn

[57] ABSTRACT

Flattened tubular food casing in combination with a deformable semi-rigid sleeve member, separate from but attached to one end of the casing in the form of a casing extension. The generally cylindrical shaped sleeve comprises a leading edge opposite the end attached to the food casing which can be tapered to assist in loading the attached casing onto a stuffing apparatus employing a reciprocating carrier. The flattened tubular food casing-sleeve member combination may be folded or mounted on a reel and packaged for direct payout to the stuffing apparatus.

18 Claims, 9 Drawing Sheets

FOOD CASINGS WITH IMPROVED TUBULAR TAB ENDS

CROSS REFERENCE TO RELATED APPLICATION

This application is a continuation-in-part of Ser. No. 573,953, filed Aug. 28, 1990 now U.S. Pat. No. 5,127,873.

FIELD OF THE INVENTION

The present invention relates generally to the packaging of film or sheet type materials which themselves are used to package goods. More particularly, the present invention relates to the packaging of tubular casings for food products, specifically flattened, non-shirred casings for continuous packaging of processed foods, such as processed cheeses, meat and sausage products.

BACKGROUND OF THE INVENTION

In the packaging of food emulsions, in particular meat emulsions into sausage-like packages, it is desired by the industry to use continuous tubular casings in order to minimize interruptions, i.e. downtime, to what can generally be classified as "automated food stuffing equipment." Generally, continuous flattened tubular casings are available packaged on, for example, a roll, coil, reel or spool, or alternatively, packaged in a folded manner. A roll or spool, as well as a coil or reel, of course, normally, although not always, needs to be mounted for rotation as the casing is fed to automated stuffing machines. Folded casing, on the other hand, does not have to be removed from its package for use, but is simply fed from the opened shipping carton directly to the automated stuffing machinery.

Where non-shirred, flattened casing is to be used, one approach to increasing the amount of running time between start-up of the automated packing equipment and shut-down to load new casing material, is to increase the size of the roll, coil, spool or reel (hereinafter collectively referred to as "rolls") on which the flattened casing is wound. This has limitations, in that the larger the size of the roll, the heavier it becomes and the more cumbersome to handle. Consequently, heavier-duty feed equipment is required to mount such rolls, and relatively higher-powered drive equipment is required to overcome the greater static inertia of such packaging to feed out the casing material wound thereon. In addition, mounting enlarged rolls becomes more difficult as such increased weight packaging is less easily handled. Thus, both weight and bulk of packages of flattened tubular food casing becomes a significant factor in relation to the facility of their use.

Another approach that has been proposed is related to the packaging of flattened unshirred casing folded and layered in boxes. Firstly, folding of the flattened casing in layers enables complete filling of squared boxes for efficient use of packaging space. This is an improvement in terms of space economy in comparison to the packaging of cylindrically shaped rolls in squared boxes. However, weight of the package is still a factor. A variety of approaches have been proposed whereby the tail end of folded flattened casing in a given box (the last portion of the flattened casing remaining in the box as it is emptied) can be attached to the lead end of a casing extracted from a new and succeeding box. The most simple approach is to splice the two ends together, on-the-fly, with some form of adhesive, such as tape. However, with the high-speed machinery used at present for automated packing, splicing on-the-fly requires a heightened degree of manual dexterity, and not all are capable of performing routinely on an error-free basis, very rapidly as required.

A further approach is disclosed in German Laid Open patent application (Offenlegungsschrift) 33 18 373.2. In this patent publication, arrangements are disclosed in which the tail end of the flattened casing is left to extend out of the packaging carton so that it ma be spliced to the leading end of the next package of flattened casing. This splicing can be effectuated while the automated stuffing equipment is in full operation, during the period in which the initial packaging carton is being emptied. Thus, the dexterity required with the packaging system of the foregoing German patent publication is less demanding since splicing operations can be performed as the casing from the carton immediately adjacent to the stuffing machine is being filled.

There is a basic problem, however, inherent in any splicing technique. That is, the splice, if it holds, ultimately will encompass the food emulsion which is packed into it. The area of the splice, even though it may be functionally acceptable, still creates an unsightly joint on the food product which customers and users tend to find objectionable. Also as suggested, frequently the splice does not hold, causing even more downtime.

Accordingly, it would be desirable to have means for enhancing the ease by which individual packages of flattened food/sausage casing can be loaded onto automated filling equipment, particularly stuffing apparatus designed to employ continuous lengths of flattened, non-shirred casing guided along a path to the stuffing horn such as by a reciprocating casing carrier device. Stuffing apparatus employing such carriers are disclosed by U.S. Pat. Nos. 4,534,084 and 3,919,739. While such carriers provide a reliable means for casing transport from a supply source to the stuffing horn of the stuffing apparatus, the initial step of threading the casing past the carrier rollers can be a slow and tedious process because most casing materials are quite flexible and difficult to maneuver through the narrow passage surrounding the carrier. A semi-rigid sleeve having tab end at the leading end of a flattened source of casing will permit easier, more efficient opening and loading of flattened casing onto the filling horn of food stuffing machines, especially those employing casing carrier devices.

Thus, the focus of the present invention is on enhancing the threadability of casing through narrow casing slots and past systems of rollers associated with casing carriers. The present invention also focuses on facilitating rapid extraction of the lead end of flattened tubular casing from new shipping cartons containing flattened non-shirred casing. This includes means for rapidly and easily opening new cartons of flattened casing.

SUMMARY OF THE INVENTION

It is therefore a principal object of the invention to provide for improved food casings employed in a flattened, non-shirred form, and which are usually dispensed from a container, such as a corrugated paperboard type or from a reel or spool. The novel casings are especially useful because they facilitate threading the leading end of folded or wound casing past guides/-roller means of stuffing apparatus. They are particularly useful in the initial loading of stuffing apparatus employing reciprocating carriers for transferring casing from casing delivery stations to casing stuffing stations.

Thus, it is one object of the invention to provide for improved flattened tubular casings in combination with a novel deformable semi-rigid sleeve, separate from but attached to one end of the casings in the form of an extension. The deformable cylindrically shaped sleeve has a leading edge opposite the end attached to the food casing as to define an opening for the casing-sleeve combination. The leading edge of the deformable sleeve consists of a generally circular configuration when the sleeve is expanded into a tubular shape.

It is yet a further object to provide for food casings wherein the generally circular configuration of the leading edge of the deformable sleeve is in a plane running transverse to the longitudinal axis of the casing-sleeve combination when the sleeve is expanded into a tubular shape. Thus, the casing extensions contemplate sleeves with leading edges which are in planes running normal to the longitudinal axes of casings, as well as edges running at acute or obtuse angles.

Accordingly, it is another object to provide for flattened tubular food casings in which the generally circular configuration of the leading edge of the semi-rigid deformable sleeves are in sloping or slanted planes running at oblique angles to the longitudinal axes of the casing-sleeve combinations when the sleeves are expanded into tubular shapes. The term "oblique" as used herein is intended to have its normally recognized meaning. It should also be understood that for purposes of this invention, the term "semi-rigid" as recited herein is intended to mean the generally tubular shaped sleeves are sufficiently inflexible to facilitate loading flattened casing attached thereto onto a filling apparatus, i.e. through guides, rollers, carriers, etc., for stuffing, but also sufficiently pliable that it can be deformed into a flattened state for packaging as an extension of the casing without adversely affecting its ability to be restored to an expanded tubular shape at the time of loading onto a filling apparatus.

Thus, the invention contemplates flattened tubular food casings with deformable semi-rigid sleeves attached thereto which casings can be folded into layers stacked side-by-side, edge-to-edge or simply multiple layers of casing stacked one on-top of the other for efficient packaging in containers, such as paperboard cartons, for example. Likewise, the invention is intended to include flattened casing rolled onto spools or reels for convenient payout to stuffing equipment.

Regardless of whether the casing is folded or wound the present invention is intended to include casings with the semi-rigid deformable sleeves detachable mounted to an exterior surface of shipping/storage containers in the form of a flattened tab-ends to enable payout from the containers without the containers being opened substantially.

Thus, it is yet a further object of the invention to provide for novel flattened tubular food casing in combination with a deformable semi-rigid sleeve, separate from but attached to one end of the food casing in the form of a casing extension. The deformable sleeve is of sufficient diameter and the leading edge of the sleeve opposite the end attached to the food casing being shaped to facilitate threading the casing onto casing carrying means of a food filling apparatus when the flattened sleeve is expanded into a tubular shape. The casings of the invention, including the threading sleeves are packaged in flattened non-shirred configurations preferably with the sleeve portion mounted to the exterior of the package to facilitate loading with only nominal opening of the container, i.e. slot in one panel of the package for easy payout. Hence, placement of packages adjacent to filling station equipment permits rapid and efficient dispensing of product with nominal downtime for loading intervals.

DETAILED DESCRIPTION OF THE INVENTION

Figure 1:
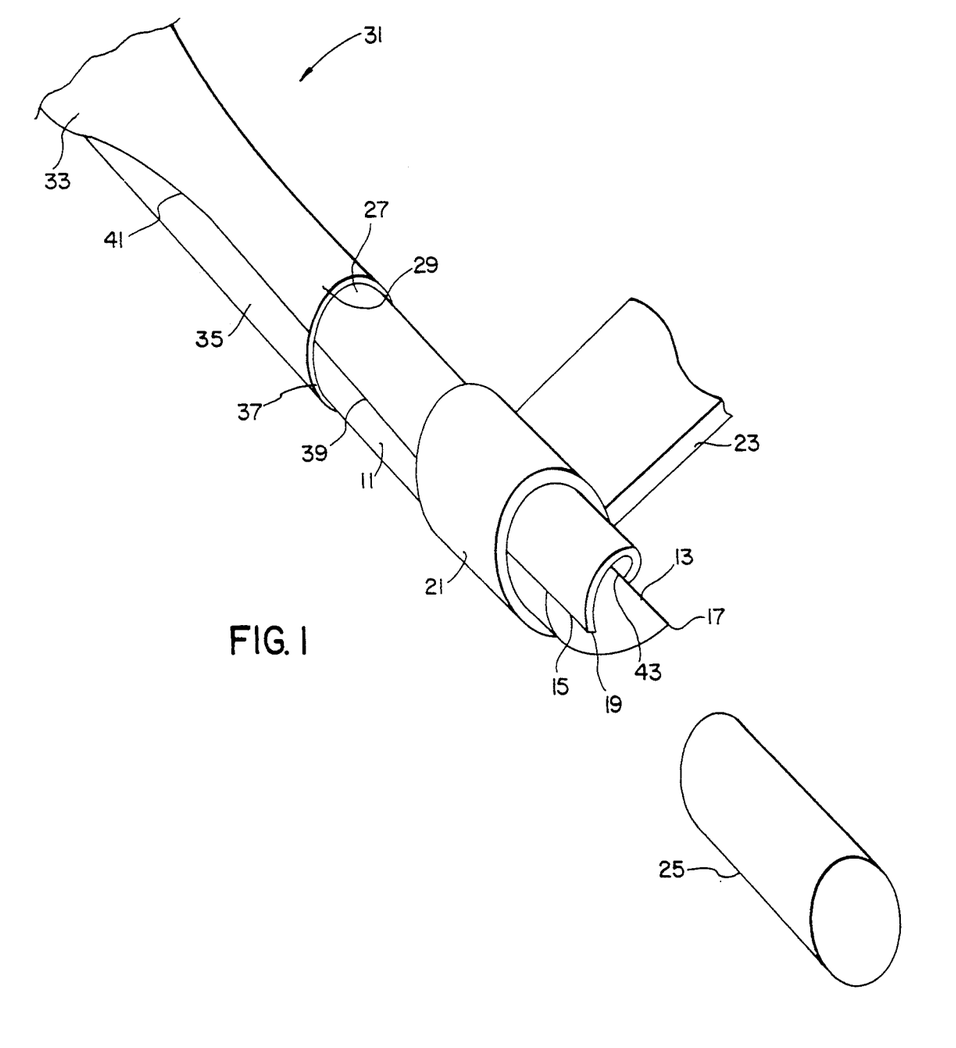
FIG. 1 is a semi-schematic projection view of a preferred lead end piece which has been compressively formed into a cylindrical shape and extended through holder means associated with automated stuffing equipment to be advanced to the point at which food emulsion is introduced into the casing.

Referring to FIG. 1, lead end piece 11 has been formed (really deformed) from its initial flat mode to the tubular configuration, specifically a cylindrical shape, as illustrated. This is preferably accomplished by the exertion of opposed pressure on the opposed side edges 13 and 15 of the lead tips 17 and 19 respectively of lead end piece 11. For example, the opposed pressure may be applied by squeezing the lead tips 17 and 19 between the thumb and index finger.

As shown in FIG. 1, the cylindrical form of lead end piece 11 has been extended through a holder means which functions to maintain the cylindrical form of lead end piece 11. The holder means shown in FIG. 1 may be, for example, a collar 21 mounted to a bracket 23, which in turn is otherwise mounted or fixed to the automated stuffing equipment (not shown). As also shown in FIG. 1, lead end piece 11 is disposed such that it is positioned to be introduced to that means of the automated stuffing machine which directly introduces the food emulsion into the casing. For example, in FIG. 1 a stuffing horn 25 is shown. It will be understood by those skilled in the art that the tubular configuration of the holder means, as well as that of the packaged stuffed food emulsion product, does not necessarily need to be cylindrical, but could, for example, be square in cross-section, a form which is well known, for example, in the packaging of a type of processed cheese product.

As the trailing end 27 of lead end piece 11 there is shown the leading end 29 of tubular casing 31. As represented in FIG. 1, tubular casing 31 is shown in transition from a flat section 33 to a tubular section 35, corresponding in size and configuration generally to the tubular form of lead end piece 11 as shown in FIG. 1. As shown in FIG. 1, lead end piece 11 is mounted to tubular casing 31 at joint 37 as will be further explained hereinafter. Juncture 39, resulting from the fabrication of lead end piece 11, is shown in FIG. 1 as will, also, be further explained hereinafter. Fold edge 41 of tubular casing 31 is shown in FIG. 1 in transition from an actual edge to merely a crease or line in a cylindrical tubular casing 31, as corresponding to the transition which occurs to transform flat section 33 into tubular section 35. As shown in FIG. collar 21 may simply be a tubular section of metal (or other relatively rigid material) with an inside dimension sized generally to fit over the tubular cross-section formed from the edge compression of lead end piece 11. As will be well understood by those skilled in the art, the addition of scoring or impressions, for additional fold lines in lead end piece 11, could produce, for example, square or hexagonal cross-sectioned tubular configurations on the compression of the edges of lead end piece 11. Correspondingly, the internal configuration of collar 21 could be changed to correspond to the desired cross-sectional shape, for example, a square or hexagon, respectively.

Figure 2:
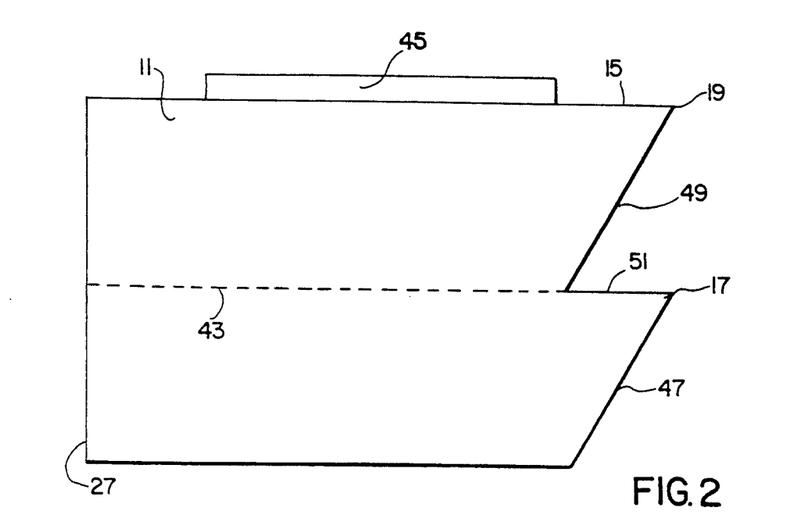
FIG. 2 is a representation of the preform from which the lead end piece of FIG. 1 is fabricated.

Referring to FIG. 2, lead end piece 11 is shown prior to its fabrication. The material used for lead end piece 11 may be anything which is more rigid, or stiffer, than tubular casing 31, and preferably it is waterproof. However, the material must be flexible and somewhat resilient to enable the formation of a tube, by deformation, as shown in FIG. 1 an as previously described. For example, lead end piece 11 may be fabricated from waterproof paper or a variety of different plastic materials, especially food grade materials.

Figure 3:
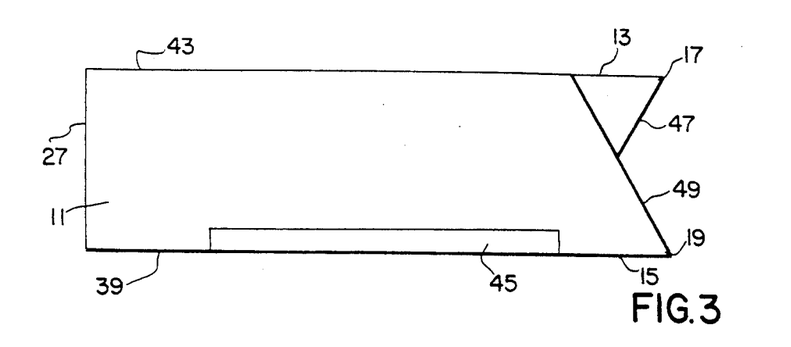
FIG. 3 is the lead end piece of FIG. 2 as fabricated.

Lead end piece 11 is made from a flat sheet of one of the appropriate materials. The flat sheet, as illustrated in FIG. 2, is sized to be generally about twice the width of the fabricated piece as shown in FIG. 3. As represented in FIG. 2, fabrication fold 43 is shown as a dotted line. In FIG. 3, on the other hand, it is shown as one of the edges of lead end piece 11. Fabrication fold 43 is the line along which the cut material, used to form lead end piece 11, is folded. Thus, fabrication fold 43, after folding, becomes one of the edges of lead end piece 11 as shown in FIG. 3. The other edge, as indicated previously, is juncture 39 as is shown in FIG. 3. Juncture 39 is formed by folding the material shown in FIG. 2 along fabrication fold 43 to form fabricated lead end piece 11 as is shown in FIG. 3. Juncture 39 when formed comprises what were previously two opposed edges of the former flat sheet, the now-folded material. These two previously opposed edges are attached to each other, for example, by sealing or fixing. In other words, the two segments of the material, separated by fabrication fold 43, are attached together at juncture 39 as shown in FIG. 3. Adhesive means, such as pressure sensitive tape 45, may be used to effect this attachment, as will be well understood by those skilled in the art. Alternatively, an extension of the same piece that is used to form lead end piece 11, as indicated by 46 in FIG. 2, could be used in place of pressure sensitive tape 45 such that when fabrication fold 43 is made, forming juncture 39, the extension piece could be folded over and attached to make the joint, for example, with glue, joining the two segments of juncture 39 together.

Again referring to FIG. 2, which is the sheet material from which lead end piece 11 is formed, it will be noted that lead tips 17 and 19 have been formed by two diagonal cuts 47 and 49 joined together by longitudinal cut 51. Longitudinal cut 51 forms side edge 13 as shown both in FIG. 3 and in FIG. 1. Side edge 15 extends from lead tip 19 in the direction of adhesive tape 45 with the length of side edge 15 being equivalent to that of longitudinal cut 51 (side edge 13). The trailing end 27 of lead end piece 11 is preferably square cut, as shown in both FIGS. 2 and 3.

Figure 2A:
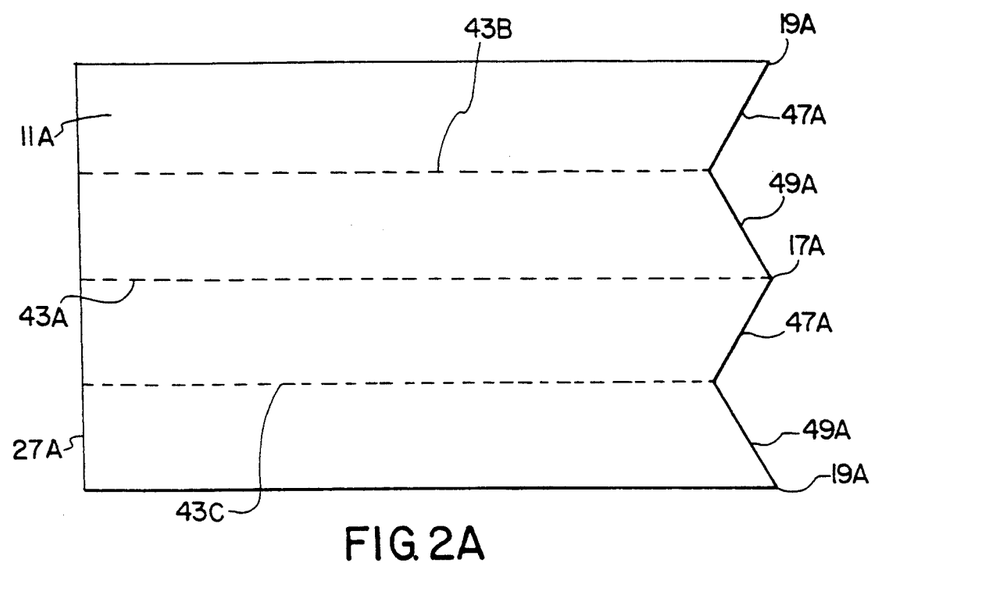
FIG. 2A is an alternative embodiment of the preform shown in FIG. 2.
Figure 3A:
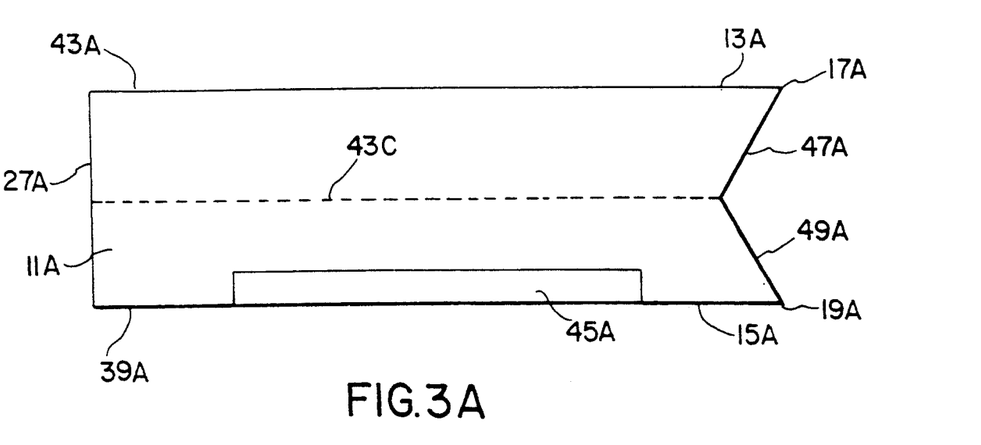
FIG. 3A is an alternative embodiment of the lead end piece shown in FIG. 3.

Referring to FIG. 2A, it will be noted that lead end piece 11A is identical to lead end piece 11, except with respect to the formation of lead tips 17A and 19A. Rather than diagonal cuts 47 and 49 being made, as shown in FIG. 2, half-diagonal cuts 47A and 49A are made, each of which extends one-half of the transverse distance across the opposed faces of the flattened tubular structure of lead end piece 11A, as shown in FIG. 3A. Thus, with respect to the alternative embodiment shown in FIGS. 2A and 3A, longitudinal cut 51 is eliminated and what were included as diagonal cuts 47 and 49 in FIGS. 2 and 3, are in FIGS. 2A and 3A, shortened to one-half their lengths, respectively, to form half-diagonal cuts 47A and 49A. The half-diagonal cuts 47A and 49A may be used with any cross-sectional arrangement of tubular form.

Also, in FIGS. 2A and 3A, it will be noted that optional fold lines 43B and 43C have been longitudinally scored into the faces of lead end piece 11A. These fold lines 43B and 43C could be utilized to form the previously exemplified square tubular cross-section in conjunction with the holder means having a square cross-section as previously described. As will be understood by those skilled in the art, additional score lines may be used in relation to the formation of other cross-sectional configurations.

Except as described above in regard to FIGS. 2A and 3A, fabrication of lead end piece 11A is, otherwise identical to that described above with respect to lead end piece 11. The function and operation of lead end piece 11A with respect to tubular casing 31, carton 57, guides 53, rollers 55, stuffing horn 25 and food emulsion packaging equipment, automated or otherwise, is identical to that described herein in relation to lead end piece 11.

Figure 4:
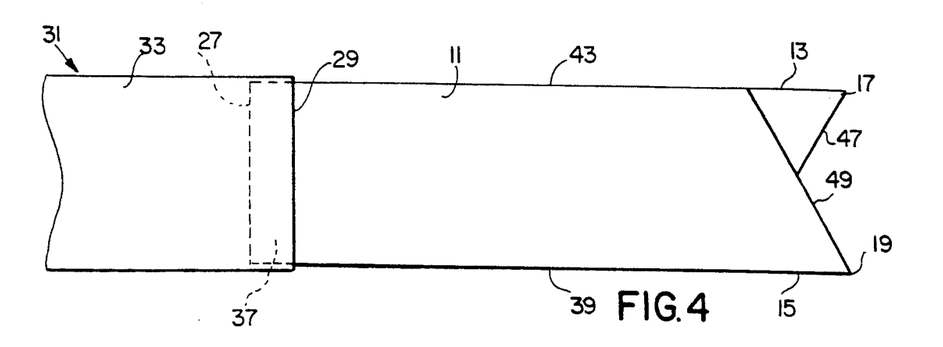
FIG. 4 is a plan view of the fabricated lead end piece of FIG. 3 as attached to and mounted to a flattened tubular casing.

Referring to FIG. 4, the fabricated lead end piece 11 of FIG. 3 is now inserted into the leading end 29 of tubular casing 31. Trailing end 27 is attached to the interior wall of tubular casing 31 which, at this point, forms a continuous flat section 33 adjacent to the leading end 29 of tubular casing 31. Preferably, the attachment means is a non-hardening adhesive material which enables leading end 29 to be readily stripped by hand from trailing end 27. Alternatively, for example, adhesive tape might be used or any other adaptable means of attachment, as will be well understood by those skilled in the art. The object is to enable the ready removal of lead end piece 11 in relation to the stuffing of tubular casing 31 with food emulsion.

Figure 5:
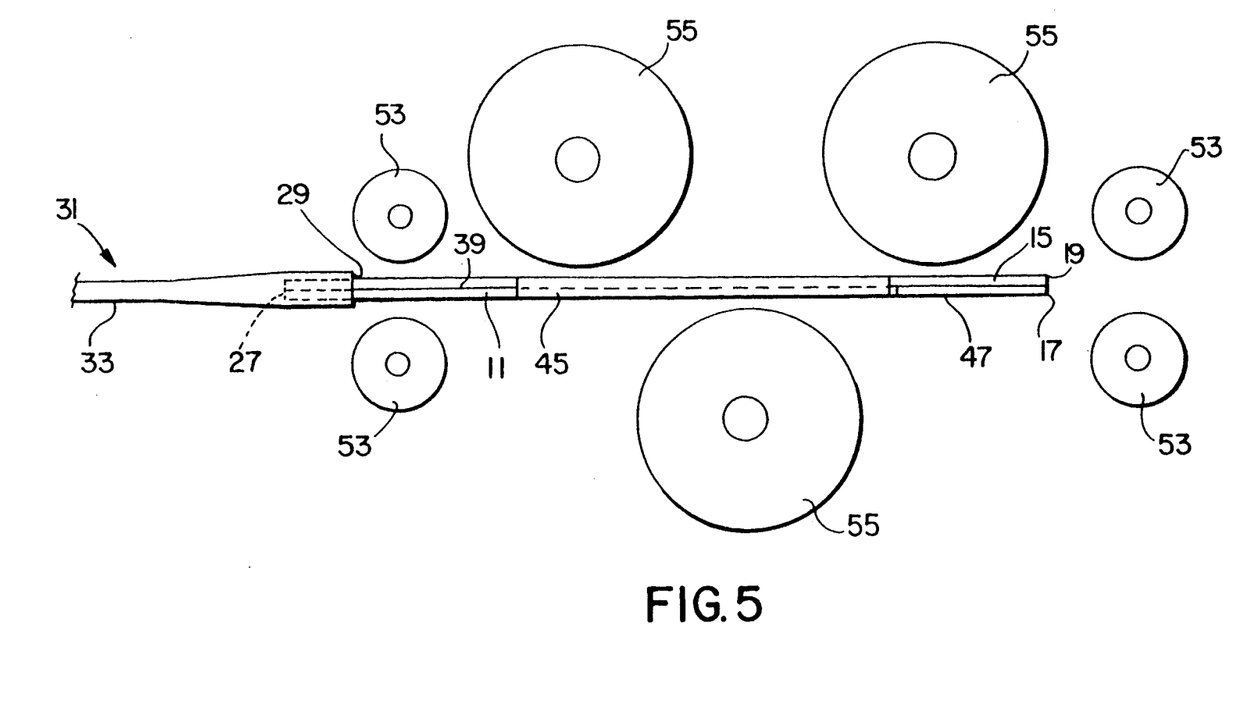
FIG. 5 is a schematic representation of the introduction of the lead end piece, with the flattened tubular casing mounted thereto, into the guide roller system of automated stuffing equipment.

FIG. 4 is a plan view of the assembly of lead end piece 11 to tubular casing 31. The elevation of this same view is shown in FIG. 5, where lead end piece 11 is shown as being threaded through a schematically represented guide/roller system of automated food stuffing equipment. As shown in FIG. 5, the guide /roller system comprises guides 53 and rollers 55. As this guide /roller system forms no part of the present invention, its detail will not be described or further illustrated. However, it should be noted that most guide/roller systems used in automated food stuffing equipment not only include means for positioning and directing the movement of tubular casing 31, those means which are applied to the flat upper and lower portions thereof, as shown in FIG. 5, but also include means for laterally positioning tubular casing transversely to its longitudinal movement. These lateral guides prevent the flow of tubular casing 31 from wandering from one side to the other. Because of these lateral guide means, the inclusion of two lead tips 17 and 19, positioned adjacent to side edges 13 and 15 respectively, provide a great advantage. As will be well understood by those skilled in the art from viewing FIG. 5, lead tips 17 and 19 provide very facile means for introduction of lead end piece 11 and, consequently, tubular casing 31, between guides 53 and rollers 55. Because of the location of lead tips 17 and 19 adjacent to side edges 13 and 15, respectively, they also provide great facility in introducing and laterally aligning lead end piece 11, and consequently, tubular casing 31 between the lateral guides just described above, but which are not illustrated. Thus, there is a functional advantage which is a single tip, or some other form of leader, cannot perform as well. This advantage might seem somewhat modest, however, when it is understood that tubular casing 31 must be inserted into the high speed automated food stuffing equipment very rapidly, (fractions of a second) and precisely at the tail end of the previous tubular casing, to enable the machine to change over from one casing to another as rapidly as possible, it will be understood that care and patience are not concepts which can be applied to the situation. Therefore, readily self-aligning lead end piece 11 provides a significant advantage and facility in rapidly and precisely feeding a new roll of tubular casing 31 into the automated food stuffing equipment.

As previously mentioned, the arrangement of side edges 13 and 15 provide great facility in transforming otherwise flat lead end piece 11 into a tubular section simply by grasping side edge 13 and 15, respectively, between the thumb and index finger and squeezing. This, of course, forces side edges 13 and 15, and lead tips 17 and 19, respectively, towards each other, causing the opposite flat surfaces of lead end piece to bow outwardly in opposed directions, thus forming a tubular section. If additional scoring lines are used, for example, fold lines 43B and 43C, other than cylindrical tubular cross-sections can be thus formed. The formation of lead end piece 11 into a tubular section also forms tubular section 35 of tubular casing 31. Lead tips 17 and 19 again provide facility in readily guiding lead end piece 11, and consequently, tubular casing 31 over, for example, a food stuffing horn 25 as indicated in FIG. Because of the dual-tipped design of lead tip 17 and 19, alignment of the tubular section, which has been formed of lead piece 11, with, for example, stuffing horn 25, is greatly facilitated.

Figure 6:
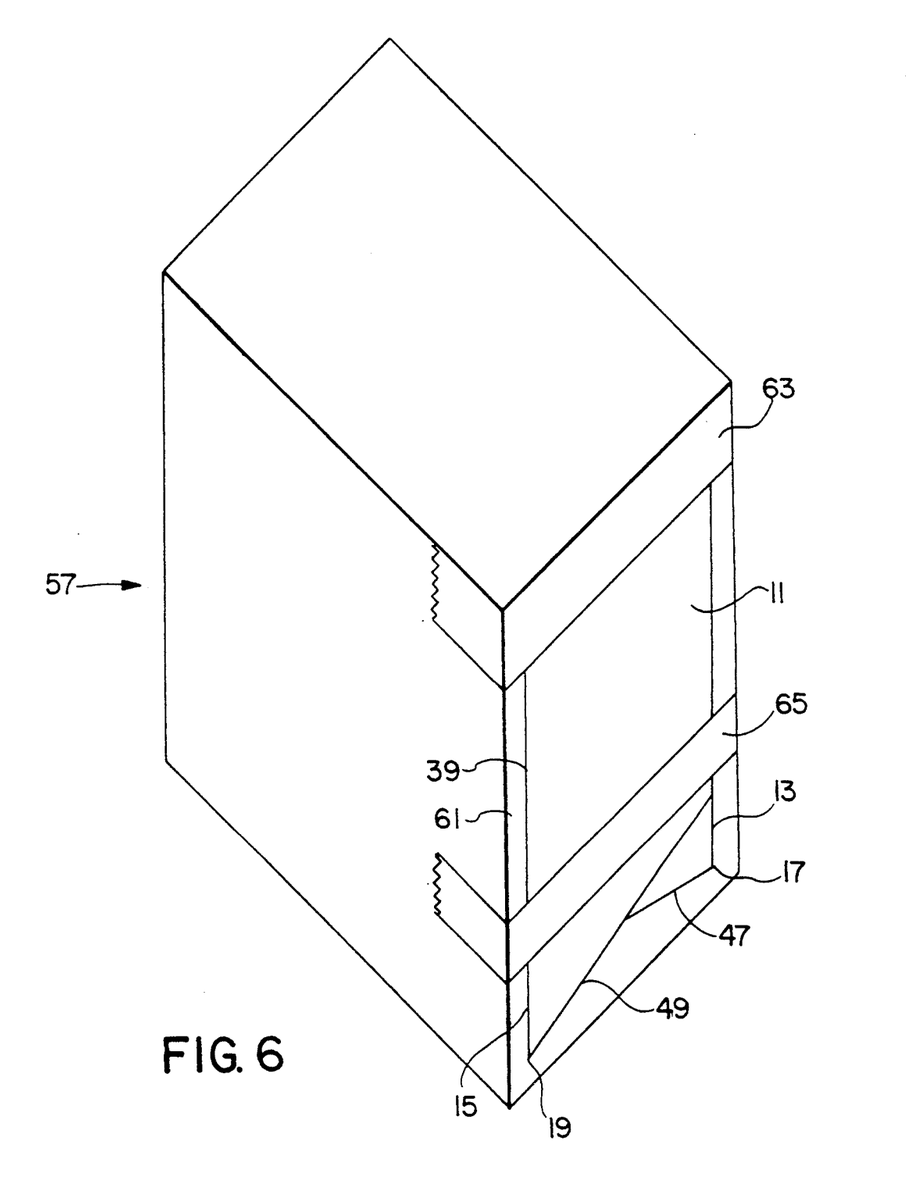
FIG. 6 is a preferred shipping container containing the tubular flattened casing with a preferred lead end piece attached thereto.
Figure 7:
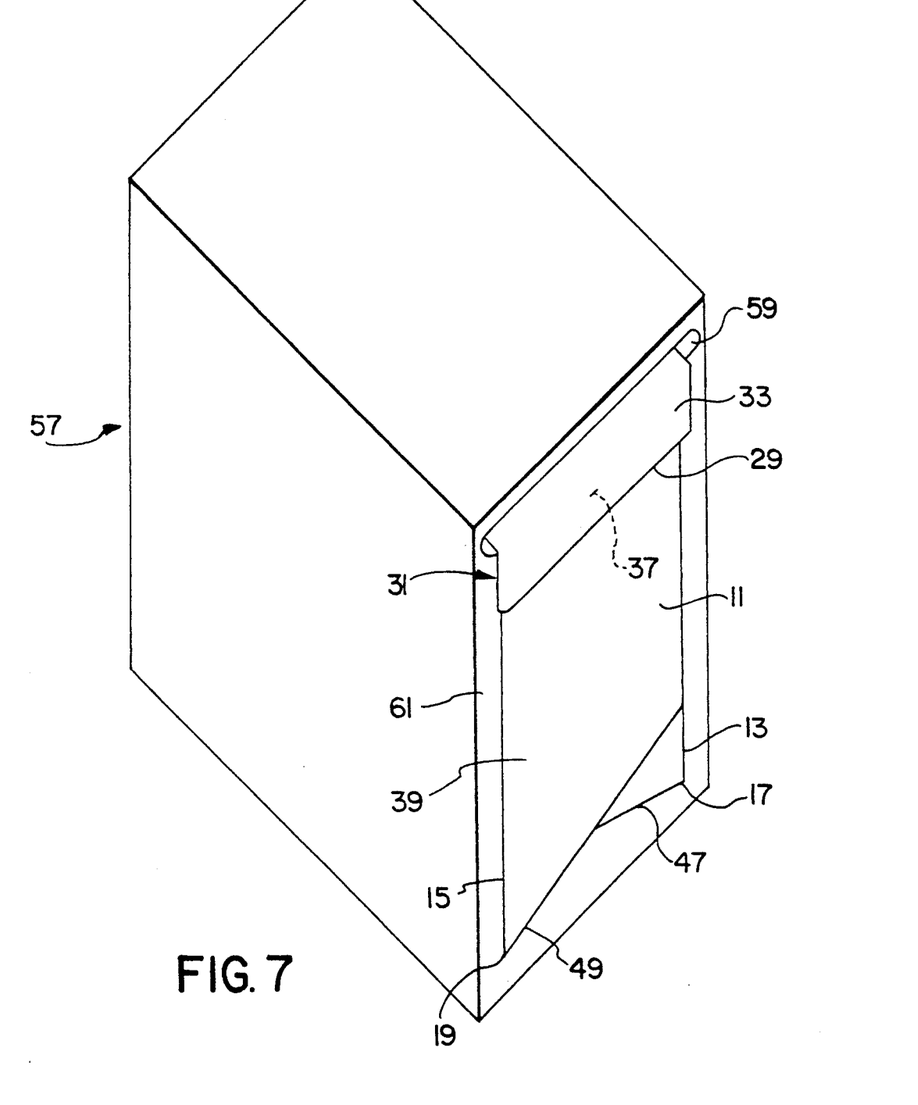
FIG. 7 is the same view shown in FIG. 6 with the package prepared for introduction of the lead end piece into the guide/roller mechanism of automated stuffing equipment.

Referring to FIGS. 6 and 7, there is shown a shipping carton 57 which is conventional except in one notable respect; slot 59 is inserted in shipping carton 57 to be aligned transversely with the longitudinal extension of tubular casing 31, which in past designs would have been packaged inside of carton 57. Otherwise, the location of slot 59 is conveniently placed at about where leading end 29 of tubular casing 31 would in past designs, otherwise have been disposed within carton 57 upon the packaging thereof. Slot 59 is in length preferably slightly wider than flat section 33 of tubular casing 31 to enable flat section 33 to readily pass through slot 59. As shown in FIG. 7, as flat section 33 passes through slot 59, it is bent about 90 degrees downwardly to be folded along carton face 61 of carton 57. Of course, the extension of tubular casing 31 (and flat section 33) is lead end piece 11 which is attached to tubular casing 31 at joint 37. Lead end piece 11 as shown in FIGS. 6 and 7 is likewise positioned flat against face 61 of carton 57.

As shown in FIG. 6, upper tape piece 63 is attached transversely across carton face 61 such that it covers the extension of flat section 33 of tubular casing 31 as well as the location or area of joint 37 where trailing end 27 is attached to leading end 29 of tubular casing 31. Also covered by upper tape piece 63 is the totality of slot 59 with tubular casing 31 extending therethrough. Upper tape piece 63 may extend around the edges of carton face 61 onto adjoining faces of carton 57 if desired. Upper tape piece 63 is readily removable by hand peeling, as it preferably employs a non-hardening adhesive material for contact attachment to carton 57.

Lower tape piece 65 is likewise transversely mounted across the carton face 61 of carton 57, its purpose being to maintain the extension of lead end piece 11, which is positioned flat against carton face 61, in general, in full contact and fully flat against carton face 61. Lower tape piece 65, like upper tape piece 63, is readily removable by hand peeling. Thus, to utilize carton 57, which is loaded with tubular casing 31, upper tape piece 63 and lower tape piece 65 are hand-peeled readily from their respective transverse positions across carton face 61, and lead end piece 11 is grabbed by hand and inserted into guide/roller means, as explained above.

As previously mentioned, the mode of packaging tubular casing 31 into carton 57 may, for example, be by a roll, i.e. wound on a reel. On the other hand, it may be folded. Preferably, in the present invention, the folded style is utilized due to the ease of extracting the full length of tubular casing 31 from the carton without removing the packed tubular casing 31 from that carton. On the other hand, rolled material, in boxed form, may readily be incorporated into the packaging system of the present invention. The only critical factor with respect to packaging is that the leading end 29 of tubular casing 31 be extended through slot 59, as previously explained. This avoids the problem of having to open up carton 57 to extract that leading end 29. Thus, the extension of leading end 29 of tubular casing 31 through slot 59, and the attachment of lead end piece 11 to tubular casing 31, enables very facile removal of all of tubular casing 31 from carton 57 without ever having to open carton 57.

Figure 8:
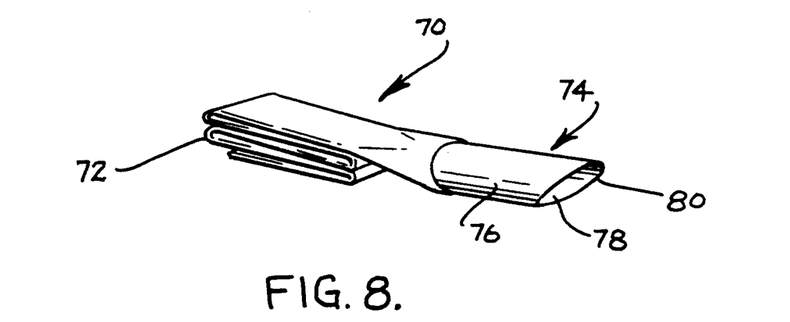
FIG. 8 is a perspective view of a further embodiment of the invention showing a flattened casing stack with layers folded one on-top of the other and a deformable sleeve attached thereto expanded into a cylindrical shape.

FIG. 8 discloses a further embodiment of the invention comprising the combination 70 consisting of flattened tubular food casing and a semi-rigid tubular sleeve member. As in other embodiments previously discussed, food casing 72 prior to stuffing is in a flattened, non-shirred condition. As shown in FIG. 8, continuous length food casing 72 may be folded by stacking one layer on top of the other, and so on. Although not specifically illustrated, the flattened casing may also be provided in the form of a roll, either on a casing spool or reel, for example.

Sleeve member 74 affixed to food casing 72, when in an expanded working shape as shown by FIG. 8, is generally in the form of a cylindrically shaped body 76 having an open bore 78 and a leading edge 80. Leading edge 80 is circular in shape following the configuration of cylindrical body 76. However leading edge 80 is preferably tapered or slanted like that shown in FIG. 8. Typically, leading edge 80 is tapered at approximately a 45° angle, for example. However, the depth or size of the angle is not critical to the invention, and it may very. By tapering the leading edge of sleeve member 74 initial loading of casing onto a filling machine for stuffing is facilitated, particularly when the filling machine is equipped with a casing carrier device (disclosed in greater detail below) for transporting casing along a plane eve with the stuffing horn.

While the leading edge 80 of sleeve member 74 is preferably slanted or tapered it should be understood that the invention also contemplates tubular sleeves with leading edges which are non-tapered, e.g. normal to the longitudinal axis of the casing-sleeve combination 70.

Sleeve member 74 while shown in an expanded cylindrical configuration is readily deformable to a flattened state, and therefore, is "semi-rigid", as previously defined. The deformable semi-rigid sleeves can be fabricated from materials previously discussed, e.g. semi-rigid plastics, such as polyolefins, like polyethylene or other suitable food grade plastics; paperboard, and the like.

Figure 9:
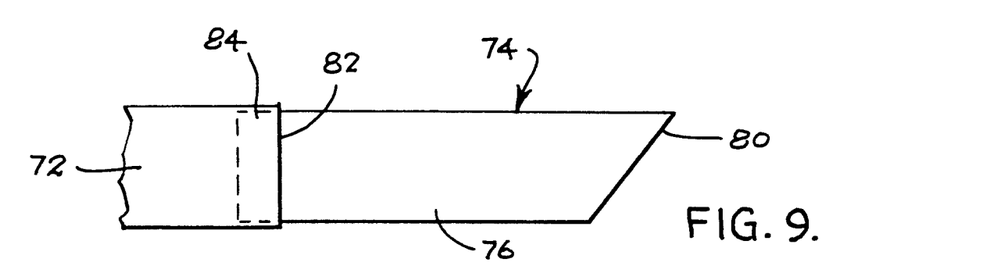
FIG. 9 is a fragmented side elevational view of the casing-sleeve combination of FIG. 8.

Cylindrical body 76 of sleeve member 74 is attached and mounted to terminal end 82 of food casing 72 (FIG. 9) in the manner previously described. In this regard, FIG. 9 consists of a side elevational view of the assembly of sleeve member 74 and food casing 72 where trailing end 84 of the sleeve member is inserted into terminal end 82 of the food casing. The sleeve member is preferably secured to the casing with a non-hardening adhesive to enable the sleeve member to be readily stripped by hand from terminal end 82. Alternatively, a joint may be formed consisting of the two components which can be heat sealed or sealed with the aid of an adhesive tape. Regardless of which method is employed for mounting the food casing and sleeve together the objective is to enable the removal of sleeve member 74 after the casing has been loaded onto the filling apparatus.

Figure 10:
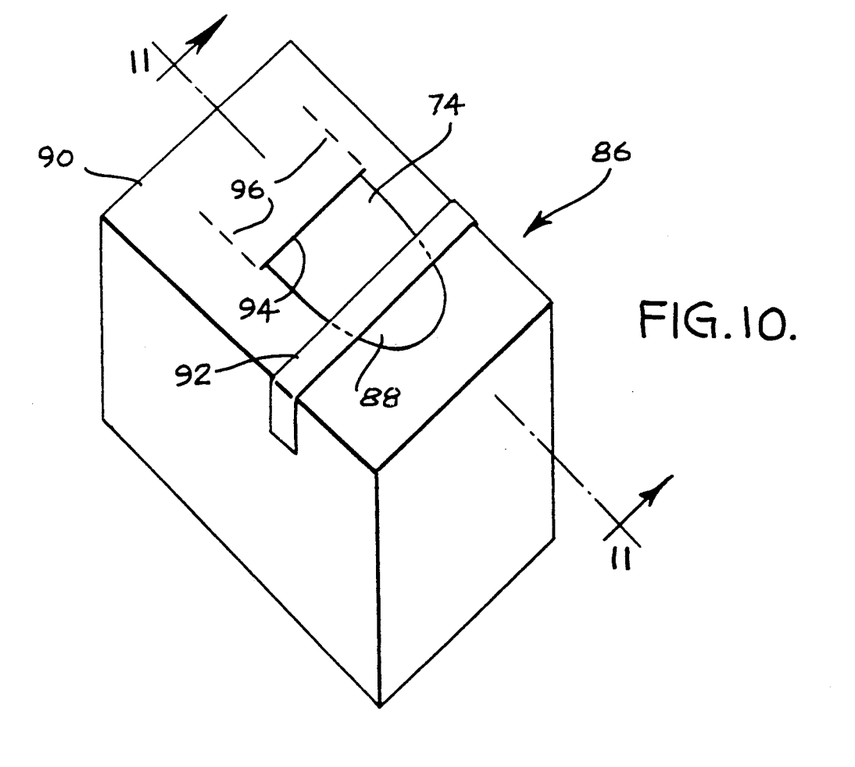
FIG. 10 is a perspective top view of a corrugated carton containing the folded-layered casing and sleeve combination of FIG. 8 with the sleeve deformed to a flattened state mounted to an exterior surface of the carton for most efficient payout.
Figure 11:
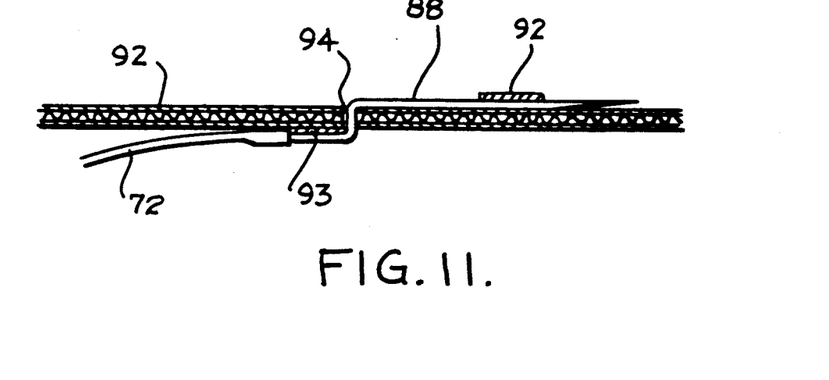
FIG. 11 is a fragmented sectional view of the casing-sleeve combination relative to a panel of the container taken along line 11—11 of FIG. 10.

As with other embodiments discussed hereinabove, combination 70 consisting of food casing 72 and semi-rigid sleeve member 74 are intended for packaging in suitable container means. In this regard, FIGS. 10 and 11 provide a representative example of paperboard container or carton 86 filled with casing-sleeve combination 70 (FIG. 8), except sleeve 74 is now flattened and in a more compact state for more efficient packaging and storage. Sleeve 74 is shown as a protruding flattened tab 88 positioned against container top wall 90.

Flattened tab 88 is secured to the exterior of container top wall 90 by means of tape strip 92 which can be readily peeled from the tab and container at the time of use. Flattened tab 88 may also be detachably fastened with a bead of non-hardening adhesive 93 against the interior surface of container top wall 90. Flattened tab 88 of sleeve 74 passes through narrow casing slit 94 in container top wall 90, which slit runs in a direction normal to the longitudinal axis of the sleeve. Casing slit 94 is somewhat wider than that of flattened tab 88 and food casing 72 to assure smooth and unrestricted payout from the carton during filling. As further safeguards, container top wall 90 of carton 86 may have two parallel scored lines 96 running in a direction normal to casing slit 94. Scorings 96 on container top wall 90 are broken at the time the package is prepared for loading onto a stuffing apparatus.

Figure 12:
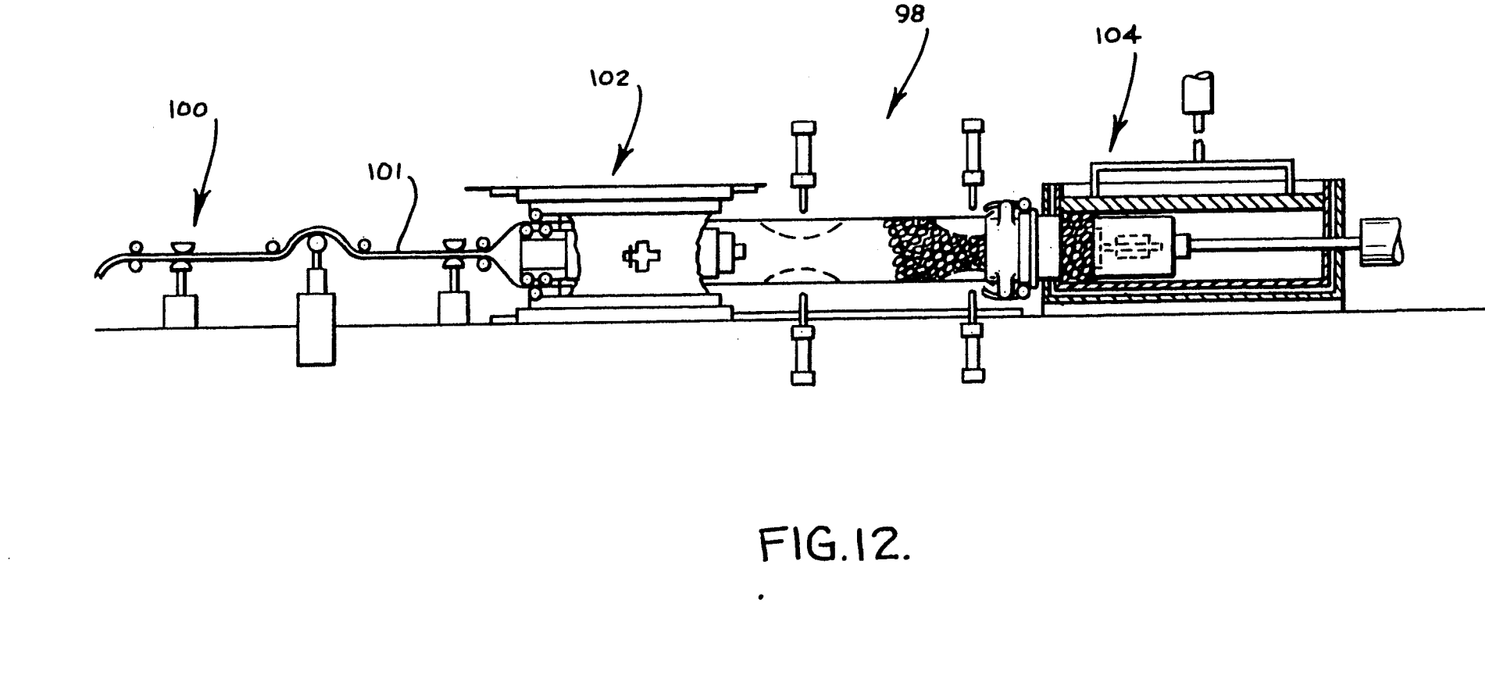
FIG. 12 is a representative example of a stuffing apparatus employing a casing carrier for transporting casing to a stuffing horn.

The food casing, semi-rigid deformable sleeve combination when packaged, such as in the manner illustrated by FIG. 10 may be placed conveniently adjacent to a stuffing apparatus for direct payout from the carton. Combination 70 is particularly useful in connection with stuffing apparatus employing reciprocating carrier means for transporting food casing to the stuffing horn. FIG. 12 provides a partial diagrammatic view of one such known stuffing apparatus 98. The stuffing apparatus of FIG. 12 is described in detail in U.S. Pat. No. 4,534,084. Other such stuffing apparatus employing reciprocating casing carriers are disclosed in U.S. Pat. No. 3,919,739. The disclosures of both U.S. patents are hereby incorporated-by-reference herein.

Apparatus 98 is comprised of casing feed and guide section 100 consisting of casing feed means, casing guide means and casing lock means which perform by engaging and withdrawing a predetermined length of flattened tubular food casing 101 from a supply (not shown). Casing 101 passes between a two part casing carrier section 102 which transports the leading end of an opened, unfilled length of casing to meat supply (pump) and stuffing horn section 104.

Figure 13:
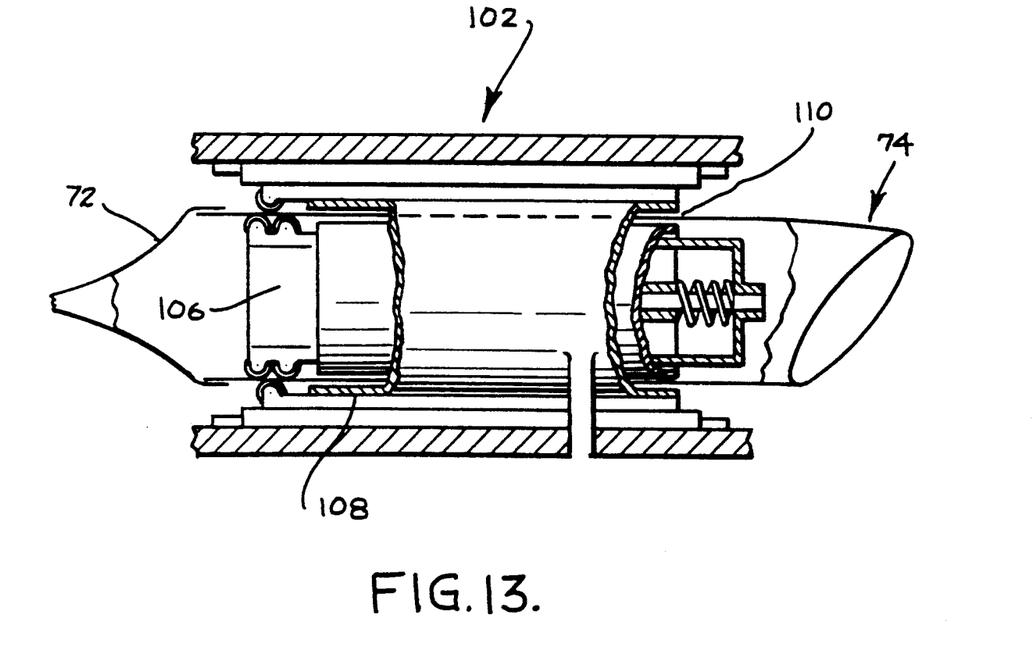
FIG. 13 is a representative casing carrier of a stuffing apparatus showing the semi-rigid deformable sleeve being used to assist in threading casing past the carrier mechanism.

As best illustrated by by FIG. 13, casing carrier section 102 consists of an inner cylinder 106 which engages with the interior wall of casing 72, and an outer cylinder 108 which engages with the exterior wall of the casing. Because of the narrow width of casing gap 110 it can frequently be a difficult task to initiate loading of a "new" casing onto such a filling apparatus. However, the semi-rigid sleeve 74 as shown by FIG. 13 can facilitate the loading process and thereby improved production efficiency.

The foregoing detailed description is an explanation of the preferred embodiment of the invention, as well as the best mode presently known to the inventors. However the scope of the present invention is not to be limited by the description of the preferred embodiment, but rather by the scope of the claims, following, which are appended hereto and made part of this specification.

We claim:

1. A food casing comprising a flattened tubular casing in combination with a deformable semi-rigid sleeve, separate from but attached to one end of said casing in the form of a casing extension, said deformable sleeve having a leading edge opposite the end attached to said food casing defining an opening for said casing-sleeve combination, the leading edge of said deformable sleeve having a generally circular configuration when said sleeve is expanded into a tubular shape.

2. The food casing of claim 1 wherein the generally circular configuration of the leading edge of said deformable sleeve is in a plane running transverse to the longitudinal axis of said casing-sleeve combination when said sleeve is expanded into a tubular shape.

3. The food casing of claim 2 wherein the generally circular configuration of the leading edge of said deformable sleeve is in a plane running at an oblique angle to the longitudinal axis of said casing-sleeve combination when said sleeve is expanded into a tubular shape.

4. The food casing of claim 2 wherein the flattened tubular casing is folded into layers.

5. The food casing of claim 3 wherein the flattened tubular casing is folded into layers.

6. The layered flattened tubular food casing of claim 4 packaged in a container.

7. The layered flattened tubular food casing of claim 5 packaged in a container.

8. The packaged tubular food casing of claim 6 wherein at least a portion of the deformable sleeve is detachably mounted to an exterior surface of said container to enable payout of said packaged casing without said container being opened substantially.

9. The packaged tubular food casing of claim 7 wherein at least a portion of the deformable sleeve is detachably mounted to an exterior surface of said container to enable payout of said packaged casing without said container being opened substantially.

10. The food casing of claim 2 wherein the flattened tubular casing is wound onto a reel.

11. The food casing of claim 3 wherein the flattened tubular food casing is wound onto a reel.

12. A food casing comprising a flattened tubular casing in combination with a deformable semi-rigid sleeve, separate from but attached to one end of said food casing in the form of a casing extension, said deformable sleeve having a sufficient diameter and a leading edge opposite the end attached to said food casing shaped to facilitate threading said casing onto means for carrying casing of a food filling apparatus when said sleeve is expanded into a tubular shape.

13. The food casing of claim 12 wherein the deformable semi-rigid sleeve has a cylindrical configuration when expanded and a generally circular leading edge defining an opening for said casing-sleeve combination, said leading edge of said deformable sleeve being in a plane which is sloped to the longitudinal axis of said combination.

14. The food casing of claim 13 wherein the flattened tubular food casing is folded into layers.

15. The layered flattened tubular food casing of claim 14 packaged in a container.

16. The packaged flattened tubular food casing of claim 15 wherein the deformable sleeve is detachably mounted to an exterior surface of said container to enable payout of said packaged casing without said container being opened substantially.

17. The food casing of claim 13 wherein the flattened tubular casing is wound onto a reel.

18. The food casing of claim 13 wherein the flattened tubular casing is wound onto a spool.

* * * * *